United States Patent [19]

Weisbrich

[11] 4,021,140
[45] May 3, 1977

[54] VARIABLE GEOMETRY WINDTURBINE

[76] Inventor: Alfred L. Weisbrich, 86 High Path Drive, Windsor, Conn. 06095

[22] Filed: Nov. 12, 1974

[21] Appl. No.: 523,028

[52] U.S. Cl. ................................. 416/117; 415/2; 416/142; 416/8
[51] Int. Cl.² .......................................... F03D 3/04
[58] Field of Search .......... 416/117, 197, 41, 111, 416/132, 141, 142, 240, 8, 66; 415/2–4, 5, 141, 181, 198, 185, 189

[56] References Cited

UNITED STATES PATENTS

| | | | |
|---|---|---|---|
| 231,812 | 8/1880 | Kelly | 416/8 |
| 243,744 | 7/1881 | Wilson | 415/203 |
| 247,266 | 9/1881 | Miller | 416/119 |
| 273,930 | 3/1883 | Yagn | 416/8 |
| 308,544 | 11/1884 | Yagn | 416/8 |
| 464,621 | 12/1891 | Fisher | 416/8 X |
| 589,530 | 9/1897 | Knowlton | 416/119 |
| 625,614 | 5/1899 | Thompson | 416/197 X |
| 802,144 | 10/1905 | Harrington | 416/41 |
| 1,296,082 | 3/1919 | Huber | 416/117 |
| 1,441,863 | 1/1923 | Luick | 415/141 |
| 1,492,432 | 4/1924 | Dean | 416/197 |
| 1,915,689 | 6/1933 | Moore | 416/117 |
| 3,887,817 | 6/1975 | Steelman | 416/166 X |

FOREIGN PATENTS OR APPLICATIONS

| | | | |
|---|---|---|---|
| 187,872 | 12/1956 | Australia | 416/197 |
| 910,581 | 6/1946 | France | 416/111 |
| 500,348 | 6/1930 | Germany | 416/197 |
| 40,378 | 12/1957 | Poland | 416/197 |

Primary Examiner—Everett A. Powell, Jr.

[57] ABSTRACT

An omnidirectional turbine providing a rotational output of one sense in response to fluid flow approaching the turbine from any direction parallel to its plane of rotation. The invention is contemplated for use in conjunction with electric generators or power generating systems in general capable of utilizing power output from said turbine.

11 Claims, 2 Drawing Figures

AA

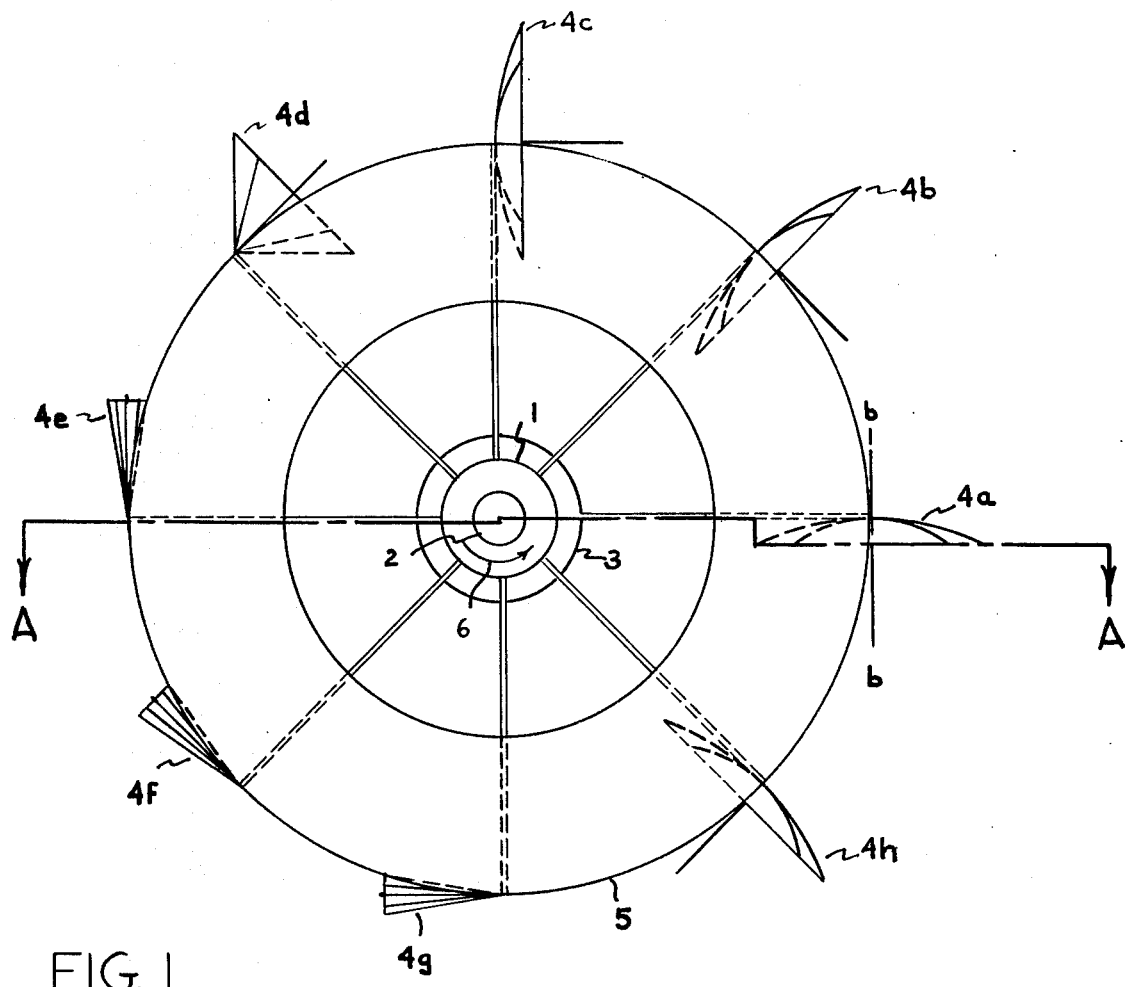
FIG. 1
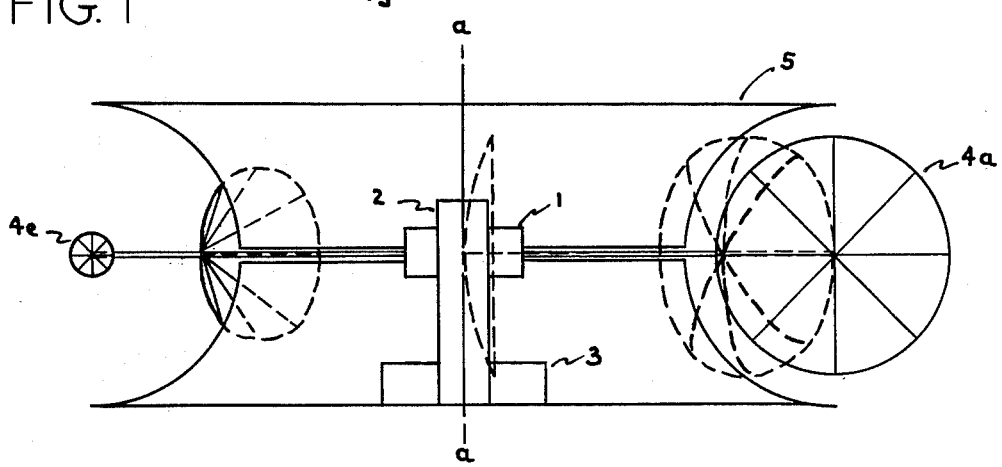
FIG. 2    AA

VARIABLE GEOMETRY WINDTURBINE

BACKGROUND OF THE INVENTION:

1. Field of the Invention

The present invention is concerned with power generation and, more particularly, to turbines providing a rotational output in response to fluid flow relative to the turbine. The invention is contemplated for use in connection with electric power generators or power generating systems in general capable of utilizing the rotational power output from the described device.

2. Description of the Prior Art

Turbines of various designs and configurations for providing a rotational output in response to fluid flow are well known in the art. However, prior art turbines are either orientation dependent to a fluid flow relative to the turbine, or are inefficient in providing power output due to induced parasite drag on working elements rotating against the fluid flow on a return stroke and due to working elements being exposed to low free stream velocities.

The present invention entails variable geometry impellers or working elements as part of a turbine-generator system. The variable geometry impellers are so constructed that points lying on an impeller or working element surface structure equidistant from a centroidal axis of said impeller and in a plane perpendicular to said axis, will have substantially 360° on three dimensional interdependent symmetry of motion on operation during various stages of deployment and that they blossom or fold open into dominant expanded fluid impact surfaces when rotating with the flow field and collapse or contract into a closed folded configuration when rotating against the flow field. This action is designed to expose the greatest possible impeller surface area to the fluid flow when a working element rotates with the flow field and is thus dominant, and minimizes the parasite drag of an impeller surface area when a working element rotates against the flow field.

It is thus an object of the present invention to provide a rotational output of a single sense in response to fluid flow at any angle in a plane of rotation relative to the device.

It is a further object of the present invention to provide impellers with surfaces that expand into dominant, preferably curved, surfaces and contract into minimally parasite drag configurations when rotating with and against the fluid flow field respectively.

It is another object of the present invention to provide a fluid flow accelerator structure which is substantially the shape of a hollow toroid of general arbitrary cross-section, an embodiment of which is shown in the drawings, providing thereby open channel means about the exterior periphery of said fluid flow accelerator surface, and is substantially concentric and interior to a revolutionary path of the working elements in order to generate an increased and improved flow velocity field about said fluid flow accelerator body, which may be stationary or may rotate with respect to the fluid impact impeller working elements.

SUMMARY OF THE INVENTION:

The present invention concerns a turbine with a predetermined sense of rotation to extract energy from a moving fluid, a plane of rotation of said turbine being parallel relative to the field of fluid flow. The turbine comprises a plurality of deflector elements mounted on an output shaft. The deflector elements are of variable geometry and so constructed that points lying on an impeller or working element surface structure equidistant from a centroidal axis of said impeller and in a plane perpendicular to said axis, will have substantially 360° and three dimensional interdependent symmetry of operation during various stages of deployment and so constructed as to expand into dominant preferably curved, open fluid impact surfaces when rotating with the fluid flow and collapse into surfaces of minimal parasite drag when rotating into the fluid flow field. A body or skirt surface as previously described interior and concentric to a revolutionary path of the impellers is also envisioned within the scope of this invention and to function either in a stationary sense or in rotation with said variable geometry impellers.

BRIEF DESCRIPTION OF THE DRAWINGS

FIG. 1 shows a top view of one preferred embodiment of the present invention.

FIG. 2 shows a sectional side view AA of preferred embodiment in FIG. 1.

DESCRIPTION OF THE PREFERRED EMBODIMENT:

Referring to FIG. 1 and 2, a hub 1 is fixed to a shaft 2 having an axis of rotation $aa$ and rotatably mounted in a support 3. Affixed to hub 1 are a plurality of variable geometry deflector or working elements $4a$ to $4h$ lying substantially in planes of rotation perpendicular to axis $aa$. Each of the variable geometry deflector elements 4 has a centroidal axis $bb$ (shown on element $4a$) along which in a first direction the element offers maximum resistance to fluid flow when in a fully expanded or open position or configuration (eg. $4a$), while it offers a relatively minimum resistance in the opposite direction when in a fully collapsed or closed configuration (eg. $4e$), as well as a lesser resistance in any other direction. The deflector elements are affixed to hub 1 by means of connecting rods, which need not lie in a plane perpendicular to axis $aa$. A fluid flow accelerator structure 5, whose shape may be comprised of a partial concentric inner section of a hollow toroid of general arbitrary cross-section intent of establishing and utilizing an increased velocity flow field in a limiting sense similar to that about a stationary or rotating cylindrical element or section in fluid flow. Arrow 6 designates a sense of rotation of the embodiment.

Shaft 2 provides a support for the turbine as well as an output for coupling a rotary motion of hub 1 to a desired point of application. Hub 1 and shaft 2 together may be a solid member.

OPERATION:

Operation of the invention depends on the effect of fluid flow on each of the deflector elements 4 and the modification of effective flow velocity profile by a stationary or rotating planar omnidirectional flow accelerator surface. Each of the deflector elements 4 has an axis $bb$ along which, in one quadrant from parallel to perpendicular to centroidal axis $bb$ a fluid will have a tendency to flow into a collapsed variable geometry deflector, expand and exert a force upon the deflector in the designated sense of rotation. The force exerted on the deflector is a maximum when flowing parallel to centroidal axis $bb$. A fluid flowing along an axis $bb$ or within a quadrant yielding a generally opposite direction will forcibly collapse the variable geometry deflector into a minimal parasite drag configuration and thereby exert a minimal retarding force to the sense of rotation. When fluid is flowing substantially perpendicular to centroidal axis bb or at a slight positive angle of attack to an already expanded curved deflector and parallel to a plane perpendicular to axis aa, a force is exerted promoting the designated sense of rotation due to the airfoil effect.

Conversely, fluid flow at any negative angle of attack to an expanded or already collapsed deflector and parallel to a plane perpendicular to axis aa will tend to collapse or keep collapsed that variable geometry deflector into/in a minimal retarding force configuration. A fluid flow accelerator surface as previously specified when stationary or rotating with deflectors provides a more efficient flow field which allows deflector elements to extract a greater amount of rotational energy from the fluid flow.

Various modifications and changes will be evident while still remaining within the scope of the invention. The deflector elements 4 may take many shapes, the only requirement being that they are of variable geometry so constructed that points lying on an impeller or working element surface structure equidistant from a centroidal axis of said impeller and in a plane perpendicular to said axis, will have substantially 360° and 3-dimensional interdependent symmetry of motion during operational stages of deployment and that they provide dissimilar parasite drag configurations when rotating with versus against a fluid flow field and that they produce a torque on a hub tending to rotate it in a given direction. It will be realized that the sensitivity and speed of rotation may be adjusted by varying: the size and shape of the deflector elements and/or introduction of governing devices; the number of elements axially as well as peripherally and vertically; the mounting angle of deflector axis to connecting rods; the mounting angle of a connecting rod axis to a plane perpendicular to a shaft axis; the size and shape of the fluid flow accelerator surface or planar omnidirectional flow accelerator; the distance at which a fluid flow accelerator surface structure and deflector elements are mounted from the axis of rotation; and the incorporation of said embodiment into or as part of land surface, water, heavier or lighter-than-air craft for the purpose of power extraction and/or utilization as part of solely as an amusement device as a toy or as part of a toy.

Many modifications and embodiments are possible within the scope and spirit of the invention.

What I claim is:

1. A power generating device comprising:
   fluid impact impellers for converting fluid energy into mechanical energy;
   a fluid flow accelerator surface having an outer structure and a shape substantially that of a partial inner concentric section of a hollow toroid providing thereby open channel means about the exterior periphery of said fluid flow accelerator;
   wherein said fluid impact impellers are mounted within said fluid flow accelerator channel means for the purpose of energy extraction from accelerated fluid velocity fields within said channel means.

2. A power generating device according to claim 1, wherein the power generating device is an omnidirectional turbine providing a rotational output in response to a fluid flow approaching the turbine from any direction to a plane of rotation, and wherein said fluid impact impellers comprise a plurality of deflector means, each having variable geometry so constructed that points lying on an impeller surface structure equidistant from a centroidal axis of said impeller and in a plane perpendicular to said axis, will have substantially 360 degree and 3-dimensional interdependent symmetry of motion during operational stages of deployment and that each blossoms open into a dominant maximum resistance fluid impact surface when rotating substantially with the fluid and collapses into a closed folded configuration of minimal parasite drag when rotating substantially into the flow field for providing a net torque of a first sense to a hub means in response to fluid flow in any direction to a plane perpendicular to an axis of rotation.

3. A power generating device according to claim 1, wherein the fluid flow accelerator surface is substantially of circular horizontal cross-section and positioned concentric and interior to a revolutionary path of working elements.

4. The omnidirectional turbine of claim 2 wherein said plurality of variable geometry deflector means comprises a plurality of umbrella-like elements, and wherein the fluid flow accelerator has its periphery substantially circular in a horizontal plane.

5. The omnidirectional turbine of claim 2 wherein the fluid flow accelerator is connected to the fluid impact impeller working elements and rotating with the working elements.

6. A power generating device according to claim 1, wherein the flow accelerator has closing covers at either verticle end of said fluid flow accelerator.

7. A power generating device according to claim 1, wherein said fluid impact impeller working elements may revolve with respect to said fluid flow accelerator body within said fluid flow accelerator channel means.

8. A power generating device according to claim 1, wherein said fluid impact impellers are rigidly mounted to and fixed with respect to said fluid flow accelerator structure within said channel means of said fluid flow accelerator, and wherein said fluid flow accelerator may rotate about a central axis in response to fluid flow into an optimum position for energy extraction by said impact impellers.

9. A power generating device according to claim 1, wherein said fluid impact impellers comprise two horizontal axis rotors mounted rigidly to and fixed with respect to said fluid flow accelerator body within said channel means; wherein each horizontal axis rotor is located substantially at an opposite extreme with respect to the other rotor within the peripheral channel means of said fluid flow accelerator; wherein said fluid flow accelerator body may rotate about a central axis in response to fluid flow.

10. A power generating device according to claim 7, wherein said fluid impact impellers comprise two horizontal axis rotors located substantially at opposite extremes within said channel means with respect to each other; wherein said horizontal axis rotors may revolve jointly in unison within said channel means.

11. A power generating device according to claim 8, wherein said fluid impact impellers comprise verticle axis rotors; wherein said verticle axis rotors are located substantially at opposite extremes with respect to each other within said fluid flow accelerator channel means.

* * * * *